May 29, 1973     L. S. McTAGGART     3,736,219

HEAT-SEALED POLYESTER FILM

Filed Aug. 30, 1971

INVENTOR
LARRY S. MCTAGGART
BY Kinney, Alexander,
Sell, Steldt & DeLaHunt
ATTORNEYS United States Patent Office 3,736,219
Patented May 29, 1973

3,736,219
HEAT SEALED POLYESTER FILM
Larry S. McTaggart, St. Paul, Minn., assignor to Minnesota Mining and Manufacturing Company, St. Paul, Minn.
Filed Aug. 30, 1971, Ser. No. 175,945
Int. Cl. B32b 3/02
U.S. Cl. 161—147                                 3 Claims

ABSTRACT OF THE DISCLOSURE

Oriented, heat set polyethylene terephthalate film edges can be joined in a strong, flexible seal by passing superposed congruent edges over a gas flame under conditions which fuse the edges into a bead having an elliptical cross section of specific dimensions and configuration.

BACKGROUND OF THE INVENTION

This invention relates to heat sealed polyethylene terephthalate films and methods of making the seals.

Polyethylene terephthalate, an extremely versatile polymer, can be formed into strong, clear oriented films which are extremely temperature resistant after heat setting and susceptible to controlled shrinkage if selectively heat set. Among the applications for biaxially oriented and heat set polyethylene terephthalate film are packages for food products which can be boiled or heated in the package.

Although it has long been known that film such as polyethylene can be heat sealed to form packages, the heat sealing of polyethylene terephthalate films has been accomplished only with great difficulty. Because the melting temperature of polyethylene terephthalate polymer is extremely close to its decomposition temperature, it has been generally considered impractical to attempt direct heat sealing of such films. Instead, polyethylene terephthalate films have typically been coated with lower melting polymers such as polyethylene, ethylene isophthalate:terephthalate copolymers, vinylidene chloride copolymers, etc., to achieve a surface which is more conducive to heat sealing. Such coating techniques require an additional processing step and the ultimate package is not capable of resisting temperatures as high as those which polyethylene terephthalate alone could withstand.

In the past, whenever attempts have been made to seal the edges of polyethylene terephthalate film directly together, the resultant product has suffered from one or more defects. For example, it has sometimes been possible to apply heat to these superposed congruent edges to form a bead, the resultant seal being capable of withstanding tensile stress but incapable of resisting bending and flexing without cracking and tearing the adjacent film.

SUMMARY OF THE INVENTION

The present invention provides a strong, flexible, heat-resistant seal for uncoated oriented polyethylene terephthalate film, a combination of qualities which, it is believed, was never heretofore attained. The invention also provides a method of achieving seals of this character.

In accordance with the invention, it has been found that a heat seal formed by fusing two superposed congruent edges of polyethylene terephthalate film is both strong and flexible if the cross section of the bead, formed in the heat sealing operation, has an elliptical cross section of specific dimensions and configuration. In particular, it has been found that the minor axis of the ellipse should extend at right angles to the plane of the superposed film and have a dimension which is on the order of 6–18 times that of the film thickness. Further, the length of the major axis should be at least about 1.4 times the length of the minor axis.

It is frankly unknown why the foregoing criteria should be so critical, but it has been empirically learned that failure to meet them results in a defective seal. For example, if the length of the minor axis of the elliptical bead cross section is less than 6 times the thickness of the film, the seal lacks sufficient tensile strength, while if the length of the minor axis exceeds 18 times the thickness of the film, the resultant seal is excessively brittle. Similarly, if the major axis:minor axis length ratio is less than about 1.4:1 (i.e., if the cross section approaches a circle), a seal is likewise brittle.

An effective method of providing heat seals having the desired characteristics involves placing the portions of film at and adjacent the edges in superposed congruent position, supporting the films on a metal heat sink with the edge extending therebeyond and passing the free portions of the film over or through a flame. As the superposed film portions are moved along a linear path parallel to the flame, the film speed, flame position and flame intensity are adjusted to form a seal having the appropriate dimensions.

BRIEF DESCRIPTION OF THE DRAWING

The invention will be better understood by referring to the accompanying drawing, in which like numbers refer to like parts in the several views, and in which.

DESCRIPTION OF PRESENTLY PREFERRED EMBODIMENTS

Figure 1:
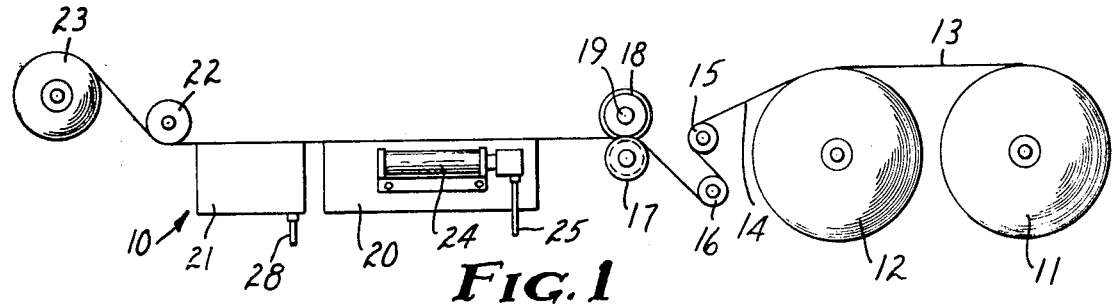
FIG. 1 is a side elevation view of equipment used in providing a heat seal in accordance with the invention.
Figure 2:
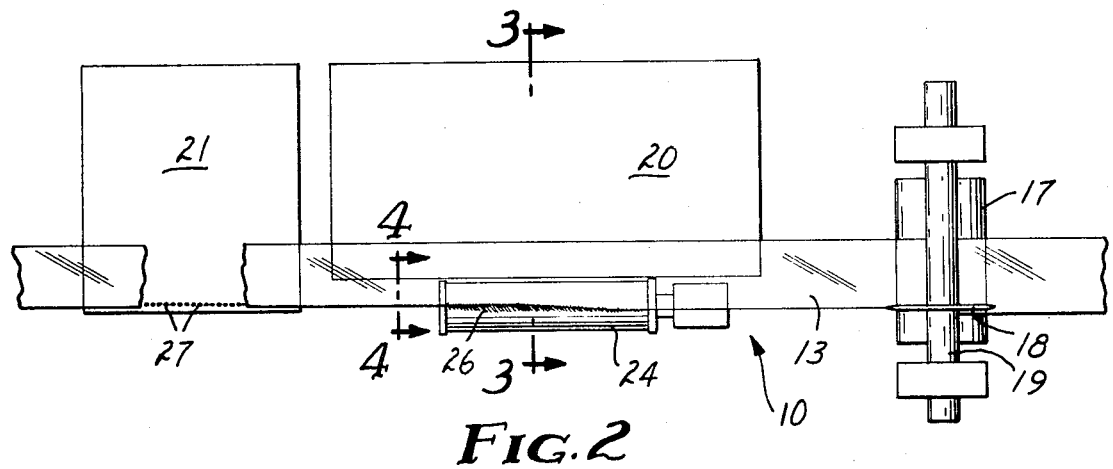
FIG. 2 is a top plan view of the equipment shown in FIG. 1.
Figure 3:
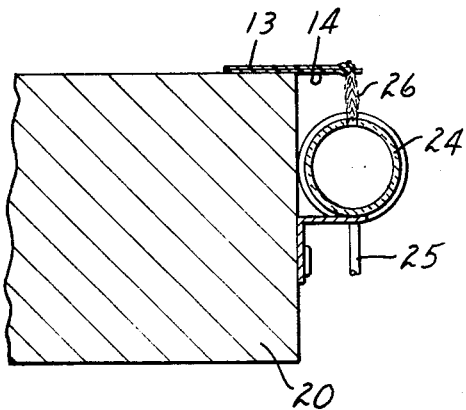
FIG. 3 is a cross sectional view of the apparatus shown in FIG. 2, taken on section lines 3—3, looking in the direction of the arrows.

The invention will now be described in illustrative form with reference to the drawing.

In practicing the invention, first supply roll 11 bearing first film 13 and second supply roll 12 bearing second film 14 are placed in parallel relation at right angles to the direction of film movement. Films 13 and 14 are superposed, passed around tension rolls 15 and 16, and then concurrently slit by passing over support roll 17 where a slitter disc 18, mounted on shaft 19, cuts off a portion of the films and provides uniform congruent edges. The superposed films 13 and 14 are then passed over support and heat sink 20, a strip of film adjacent the edges extending about 2–6 mm. beyond the support to permit heat sealing in a manner to be described subsequently. The heat sealed film then passes over cooling station 21, under tension roll 22, and is wound up on roll 23. (Alternatively a single sheet of film can be folded longitudinally, trimmed and sealed to form a tube.)

Beneath the extending superposed film portions 13 and 14, is positioned flame unit 24, which consists essentially of an elongate 1-inch i.d. pipe having a series of 21 $\frac{3}{32}$-inch holes, spaced at about ¼ inch on centers, along the top. A combustible mixture of city gas and air is supplied to flame unit 24 through connecting hose 25 in the proper mixture to produce an intense flame at each of the aforementioned holes. The individual flames fan upon emergence from the holes and effectively join to form a continuous flame 26. With the equipment described, when films 13 and 14 are each approximately 25 microns thick, the flame providing an effective temperature in the range of 650–800° C., it is desirable to position the upper surface of the flame unit approximately 15 millimeters beneath the film 14 and direct the flame 2 to 6 millimeters in from the congruent film edges. With such an arrangement, it has been found possible to obtain satisfactory seals when the speed of the film ranges between 15 and 50 meters per minute, optimum results being obtained at approximately 30 meters per minute. It will, of course, be apparent that gas pressure, flame dimensions, film thickness, etc. all affect the film speed required.

It has been found helpful, although not absolutely essential, to provide a means for cooling the seal shortly after formation by passing it over a hollow cooling station 21 having a series of holes 27 along the upper surface, compressed cooling air being supplied to the station from pipe 28.

Figure 4:
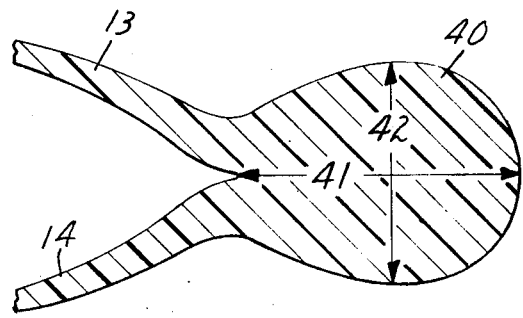
FIG. 4 is a greatly enlarged cross sectional view of a heat seal made in accordance with the invention, taken along section line 4—4 in FIG. 2, looking in the direction of the arrows.

Turning now to FIG. 4, it wil be noted that films 13 and 14 have been fused at their superposed congruent edges to form a seal 40 of unoriented polyethylene terephthalate. The shape of this film, taken in cross section, is generally elliptical, having major axis 41 extending generally parallel to the plane of films 13 and 14 and minor axis 42 extending generally perpendicular to the plane of the films. It will be noted that portions of films 13 and 14 immediately adjacent the elliptical seal appear somewhat thicker than the main body of films 13 and 14, showing a gradual transition.

It has been found that there are two important criteria of determining the effectiveness of the seal formed in accordance with the invention, viz, strength and flexibility. Strength can be measured by placing film 13 in the upper jaws of a tensile machine, film 14 in the lower jaws, and separating the jaws at the rate of 5 inches per minute. For 25-micron film, it has been found that the strength should be at least about 10 lbs./inch of width, or approximately 180 gms./cm. For consistently good results it has been found that the minor axis of the bead cross-section should be about 200 microns.

A simple way of determining whether a heat seal is flexible or brittle is to fold the sealed films together at right angles to the heat seal, form a crease with the thumb nail, fold the films back on themselves through 360°, again crease the seal, and then determine if the films tear readily at right angles to the seal. Seals made in accordance with the present invention do not crack and films having such seals do not tear readily.

A somewhat less subjective way of measuring flexibility involves a variation of the well known MIT fold test. This test, which utilizes equipment given the ASTM designation D 2176, is generally described in ASTM Test D-643-63T. Basically the test involves cutting a 15 millimeter wide strip along the area of the sealed film adjacent and including the heat seal bead. The lower end of the strip is gripped in a pair of jaws, while ½ kg. of tension is applied to the upper end. The jaws are then oscillated at a rate of 175 complete cycles per minute, through a total arc of 135°. A heat seal is considered satisfactory if the films do not break within 100 cycles.

The manufacture and testing of heat seals in accordance with the invention has been described in connection with 25-micron film, but it will be readily appreciated that the principles also apply to films of greater or lesser thicknesses. Speaking in general terms, it appears that the requisite strength is directly related to the thickness of the film, while brittleness appears to be more independent of film thickness. It will likewise be appreciated that there may be other techniques which are capable of generating seals having the dimensions and configurations described in connection with a flame sealing method and the invention includes seals made by such other techniques.

What is claimed is:

1. A structure comprising polyethylene terephthalate film having two superposed and congruent edges, said film being oriented at least in the direction parallel to said edges, and portions of said film at and adjacent said edges being free from other interposed polymeric material, said edges being joined by a flexible bead of unoriented polyethylene terephthalate which is substantially free from cracks and generally elliptical in cross-section, the configuration of said cross-section being such that the minor axis extends generally at right angles to the plane of the films and has a length which is on the order of 6 to 18 times as great as the film thickness and the major axis: minor axis length ratio is at least 1.4:1.

2. The structure of claim 1 wherein the film is about 25 microns thick and the minor axis of the elliptical bead cross-section is about 200 microns, said bead having a strength of at least about 10 lbs. per inch of width and a brittleness value of at least 100 cycles.

3. The structure of claim 1 wherein the film is biaxially oriented and heat set.

References Cited
UNITED STATES PATENTS

| | | | |
|---|---|---|---|
| 3,066,064 | 11/1962 | Pommer | 156—497 X |
| 3,334,004 | 8/1967 | Faust et al. | 156—515 X |
| 3,449,196 | 6/1969 | Hirosuke Yumoto et al. | 156—498 |

WILLIAM A. POWELL, Primary Examiner

U.S. Cl. X.R.

156—82, 217, 267, 270, 306, 497; 161—118, 149, 402